United States Patent [19]

Hanagan et al.

[11] 4,225,183
[45] Sep. 30, 1980

[54] MOTORCYCLE SEAT WITH PIVOTABLE ARMRESTS FOR THE PASSENGER

[75] Inventors: Michael W. Hanagan, Somers; Donald I. Schoeck, Wolcott, both of Conn.

[73] Assignee: Corbin-Gentry, Inc., Somersville, Conn.

[21] Appl. No.: 2,781

[22] Filed: Jan. 11, 1979

[51] Int. Cl.² .............................................. A47C 7/54
[52] U.S. Cl. .................................... 297/417; 297/195; 297/243; 297/DIG. 9
[58] Field of Search .............. 247/195, 216, 243, 417, 247/DIG. 9

[56] References Cited

U.S. PATENT DOCUMENTS

| 585,913 | 7/1847 | Haynes | 297/417 |
| 766,484 | 8/1904 | Armstrong | 297/417 X |
| 1,662,718 | 3/1928 | Regard | 297/243 X |
| 2,383,173 | 8/1945 | Watter | 297/417 X |
| 3,425,745 | 2/1969 | Michels | 297/195 |
| 3,544,163 | 12/1970 | Krein | 297/417 |
| 3,550,958 | 12/1970 | Krein | 297/417 |
| 3,612,606 | 10/1971 | Swenson | 297/417 |
| 3,807,799 | 4/1974 | Freedman | 297/417 |
| 3,951,452 | 4/1976 | Harder | 297/417 |
| 4,125,285 | 11/1978 | Hanagan | 297/243 X |

Primary Examiner—James C. Mitchell

[57] ABSTRACT

An armrest assembly adapted for mounting on the back portion of a motorcycle seat includes armrests that are pivotably mounted for pivoting about horizontal and vertical axes. Pivoting about either axis is possible from the normal position, and pivoting can be effected merely by applying a moment to the armrest about the desired axis. As a result, rapid dismounting during an emergency is readily permitted.

13 Claims, 9 Drawing Figures

MOTORCYCLE SEAT WITH PIVOTABLE ARMRESTS FOR THE PASSENGER

BACKGROUND OF THE INVENTION

The present invention relates to armrests for seats, and it finds particular, though not exclusive, application in rear seats for motorcycles.

The typical rear-seat rider on a motorcycle holds on to the driver to keep securely in position on the bike. This is a satisfactory position for short rides, but it is somewhat uncomfortable for touring. With the advent of contoured rear seats having seat backs, this position has become unnecessary because the occupant of such a seat feels relatively secure even when he is not holding on to the driver. He can thus assume a relaxed position, leaning against the seat back.

In the relaxed position, additional comfort would be added if armrests were provided. The idea of providing armrests for the rear seat of a motorcycle is not new. Such an idea had surfaced as early as 1928, as is exemplified by Regard, U.S. Pat. No. 1,662,718. Nonetheless, armrests for motorcycle seats have not heretofore gained much acceptance, possibly because of the particular characteristics of the motorcycle environment. One normally can only mount the rear seat of a motorcycle from the side when a seat back is provided, so the provision of armrests interferes with access to the rear seat. Furthermore, it is often desirable in emergencies to alight from the bike with some haste, and the presence of armrests could complicate dismounting. Given these considerations, it is not surprising that motorcycle armrests have not gained any more acceptance than they have.

According to the present invention, the armrests are pivotably mounted so that they may be swung out of the way to permit the passenger to get on and off easily. Movable armrests have been known in other contexts, but none are really satisfactory for motorcycle application. Swenson, U.S. Pat. No. 3,612,606, discloses an armrest that is locked in position but that can be rotated out of the way by lifting the armrest out of the locking position and then rotating it sideways. In the motorcycle context, it is questionable that the rider would consistently react to the exigencies of the situation by calmly lifting the armrest and then rotating it outwardly. Accordingly, though Swenson describes an arrangement for pivoting the armrest out of the way, it is not thought that such an arrangement would gain acceptance as a motorcycle armrest.

U.S. Pat. No. 3,951,452 to Harder describe an armrest whose features are closer to those desired in a motorcycle environment. In Harder the armrest is unlocked by applying a force in the direction in which the occupant wants to leave the seat, an action that, compared with the action required by the Swenson arrangement, is more likely to be taken without reflection by a person attempting to dismount the bike with haste. Moreover, the force required to unlock the armrest in Harder could easily be made low enough to allow rapid dismounting from the bike. As a practical matter, though, the force required for unlocking in the Harder arrangement would have to have a relatively high value so that the armrest would not be unlocked accidentally by a momentary jolt, and the resistance afforded to dismounting would be correspondingly high. Accordingly, the Harder arrangement cannot easily be adapted to the motorcycle environment or others subject to similar constraints.

SUMMARY OF THE INVENTION

An armrest assembly according to the present invention for mounting on a seat having a seat portion and a back portion includes a support adapted for mounting on the back portion of the seat with its forward face disposed against it. A pair of armrests is disposed on opposite sides of the support to extend along opposite sides of the associated seat. Each armrest has one end pivotably supported on the support for pivoting relative to the support about a first axis that extends substantially parallel to the plane of the forward face. By application of a moment to the armrest about the first axis, the armrest can be pivoted from a first stable position, in which the armrest extends substantially perpendicularly to the plane of the forward face, and thereby to the associated back portion along the side of the seat when the support is mounted on the back portion, through an arc of at least about fifteen degrees to a second stable position. Each of the armrests is also pivotable relative to the support about a second axis substantially perpendicular to the first axis. Application of a moment to the armrest about the second axis produces movement of the armrest from the first position of the armrest through an arc of at least about fifteen degrees about the second axis to a third stable position, in which ease of dismounting from the seat is permitted when the support is mounted on the back portion of the seat.

The armrest assembly may include bias means associated with each armrest that apply a moment to the armrest about the second axis to bias the armrest in the first position when the armrest is in the first position. The bias means would also bias the armrest in the third position when the armrest is in the third position, and it is desirable for the moment applied by the bias means to be lower when the armrest is in a range of positions intermediate between the first and third positions than when the armrest is in the first position.

It is convenient for the first axes to be coincident and for the armrest assembly to include a mounting member mounted in the support for pivoting about the coincident first axes. Each of the armrests would be pivotably mounted on such a mounting member for pivoting relative to the mounting member about the second axis but prevention of pivoting about the first axis. Pivoting of one of the armrests about the first axis would thereby cause pivoting of the other armrest about the first axis.

In one embodiment the bias means associated with each of the armrests include a coil spring attached at one end to the mounting member and at the other end to a point on the armrest spaced from the second axis. There should be an intermediate position of the armrest between the first and third positions in which the spring extends through the second axis.

Second bias means may also be provided to apply a moment about the first axis to bias the armrests in the first position when they are in the first position and to bias them in the second position when they are in the second position. The second bias means should apply a moment, when the armrests are in a range of positions between the first and the second positions, that is less than the moment applied when they are in the first position.

The second bias means can conveniently include a coil spring attached at one end to the support and at the other end to a point on the mounting member spaced from the first axis. There should be a position of the armrests intermediate between the first and second positions in which the spring extends through the first axis.

Also included within the scope of the invention is a seat assembly with a seat portion and a back portion on which the armrest assembly is mounted by virtue of having the support mounted on the back portion with its forward face disposed against it.

BRIEF DESCRIPTION OF THE DRAWINGS

These and further features and advantages of the present invention are described with reference to the attached drawings, in which.

DETAILED DESCRIPTION OF THE PREFERRED EMBODIMENT

Figure 1:
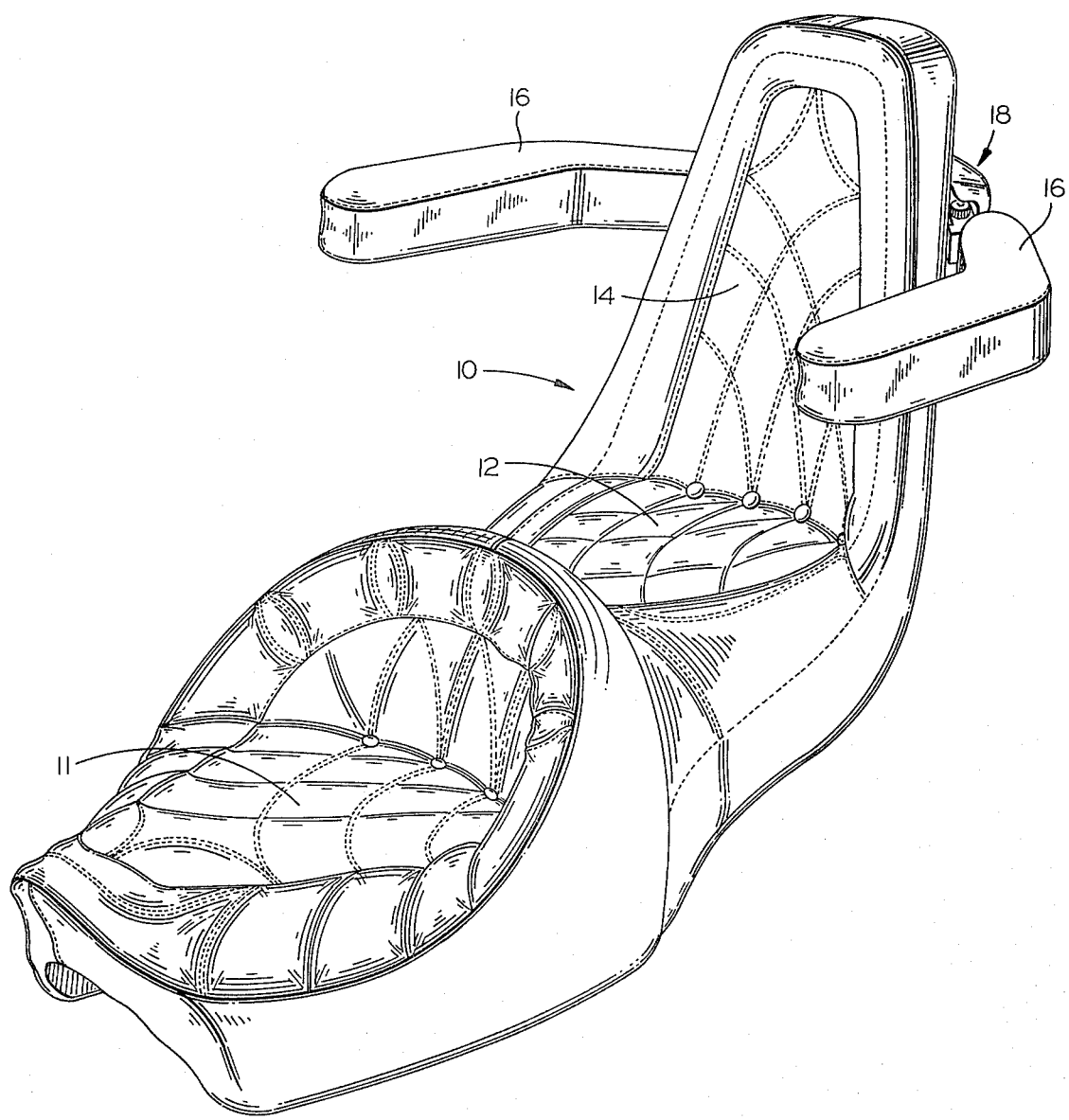
FIG. 1 is a perspective view of a seat having the armrest assembly of the present invention installed on it.

FIG. 1 shows a seat arrangement for a motorcycle. The seat assembly, indicated generally by the reference numeral 10, includes a front seat portion 11, a rear seat portion 12, a back portion 14, and an armrest assembly 18 mounted on back portion 14. Front seat portion 11 is used by the driver, while rear seat portion 12 and armrests 16 of an armrest assembly 18 are used by the passenger. According to the present invention, the armrests are provided so that they can be pivoted outwardly as shown in FIG. 2 or upwardly as shown in FIG. 4 from the position shown in FIG. 1.

Figure 2:
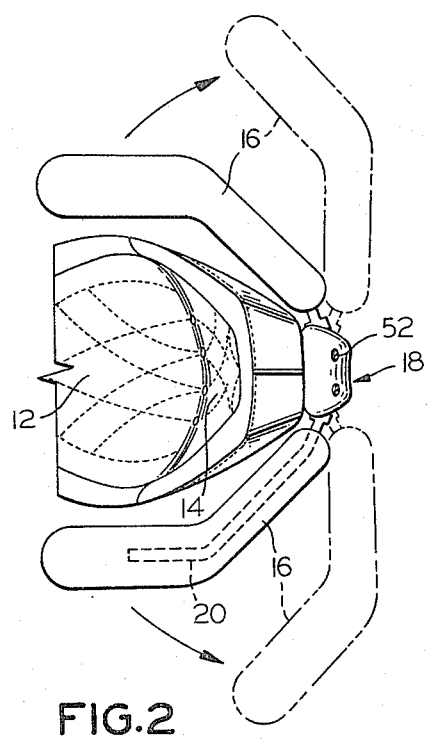
FIG. 2 is a plan view of the armrest assembly and a portion of the seat showing the pivoting of the armrests in a horizontal plane.
Figure 3:
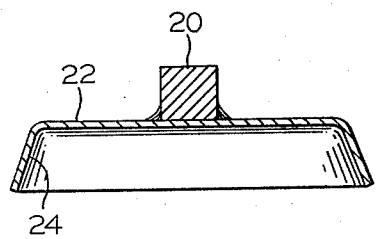
FIG. 3 is a cross-sectional view of the armrest in an early stage of construction.

Dashed lines in FIG. 2 show the location of a bar member 20 that together with a sheet-metal portion 22 shown in FIG. 3 provides a skeleton to which the padding and upholstery of the armrest are applied. The bar member 20 provides the strength required of the armrest, while the sheet-metal portion 22 is shaped as shown in FIG. 3 to give the desired form to the armrest.

Figure 4:
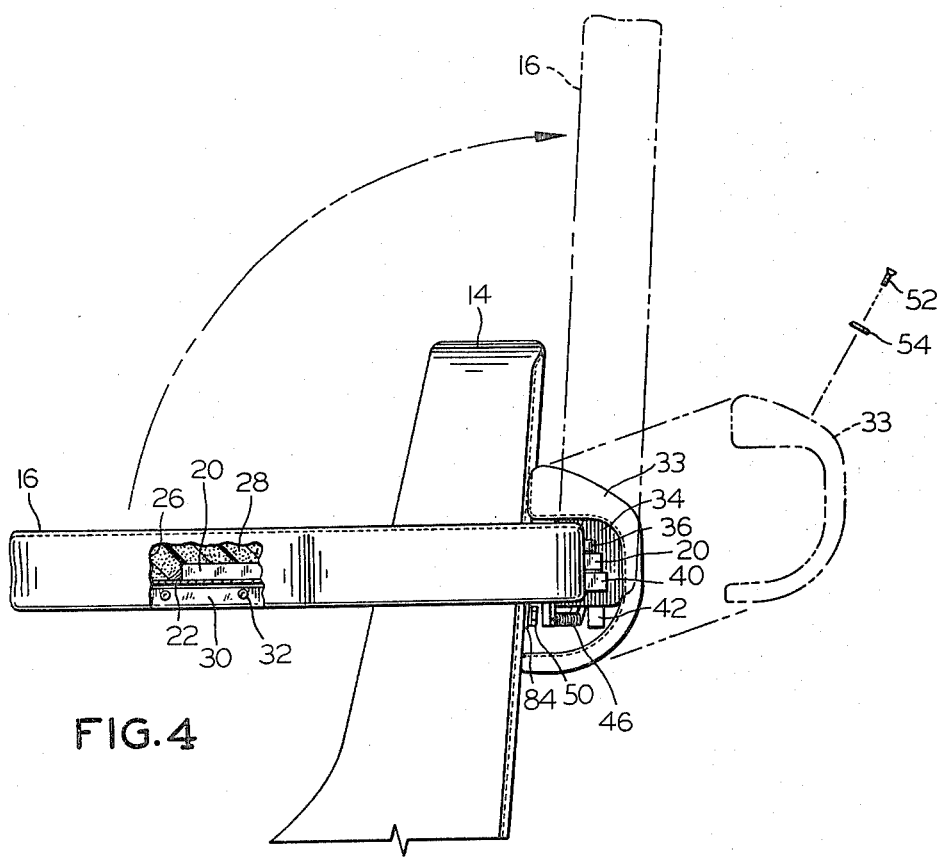
FIG. 4 is a side elevation with parts broken away showing the armrest assembly of the present invention mounted on the back portion of the seat, pivoting of the armrest in a vertical plane being shown in phantom.

As seen in FIG. 4, armrest 16 is normally in a first position in which it extends substantially perpendicular to back portion 14 along one side of the seat. It is pivotable about an axis parallel to the plane of the back portion to assume a second position, which is shown in phantom in FIG. 4. As noted previously, the armrest 16 is also pivotable about a second axis perpendicular to the first to assume a third position shown in phantom in FIG. 2.

It is noted that the angle between the first and second positions is about ninety degrees, while that between the first and third positions is closer to thirty. Neither of these quantities is critical, but it is of course desirable that the amount of pivoting be enough to permit easy mounting and dismounting by the passenger. As a practical matter, therefore, it is thought that an arc of at least fifteen degrees should be provided between the positions.

Several of the members of the armrest assembly can be seen in FIG. 4, including a side plate 34 of the armrest-assembly support and a mounting portion 40 of a mounting member to which bar member 20 of armrest 16 is mounted for relative pivoting about the second, vertical axis. The armrest assembly is mounted to the rear of the back portion 14 of the seat by means of a bolt 50 through a forward face 84 of the armrest-assembly support, and a cover 33 for the armrest assembly is fastened to the armrest-assembly frame by means of a screw 52 and washer 54.

The armrest 16 is broken away in FIG. 4 to reveal foam-rubber padding 28 located outside sheet-metal portion 22 and covered by leather or similar upholstery 26. The inner surface 24 (FIG. 3) is represented in FIG. 4 by reference numeral 30, which shows this inner surface as covered by the upholstery 26, which is fastened to it by suitable rivets 32. Cover 33 is also suitably unholstered.

Figure 5:
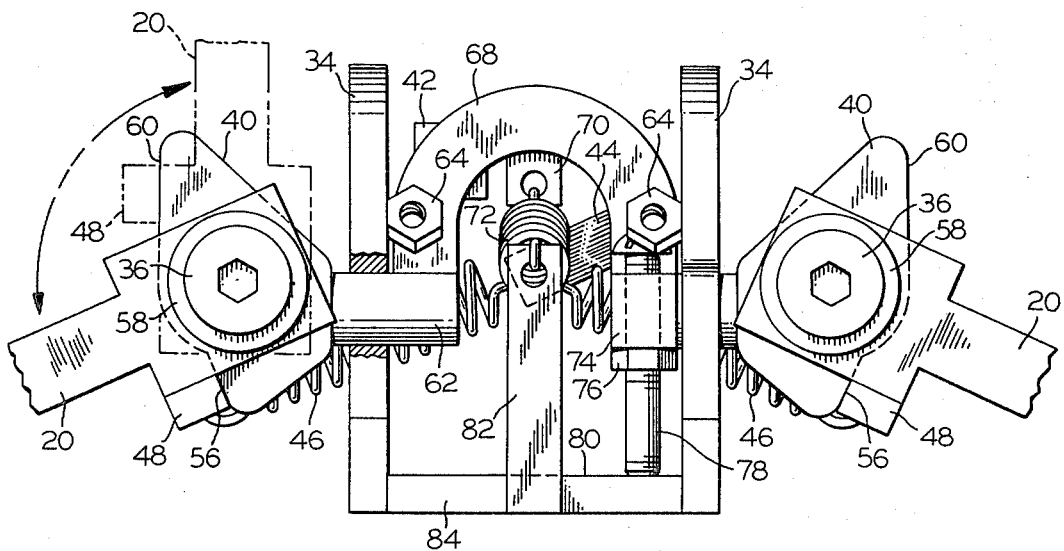
FIG. 5 is a plan view with the cover removed and parts broken away of the support, mounting portion, and associated members.
Figure 6:
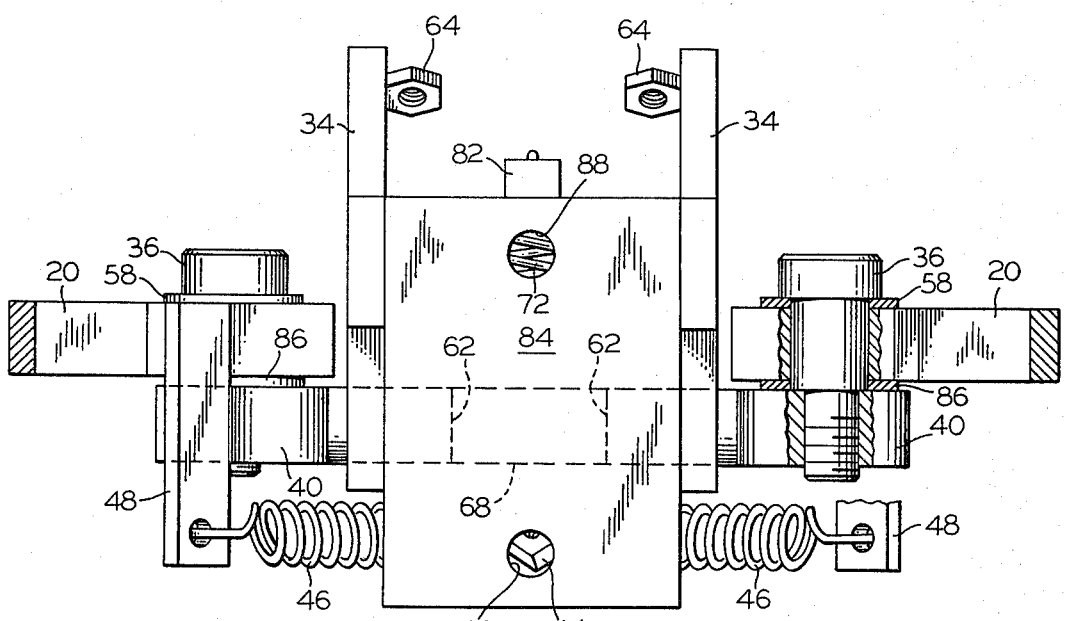
FIG. 6 is a front elevation with parts broken away of the portion of the armrest assembly shown in FIG. 5.
Figure 7:
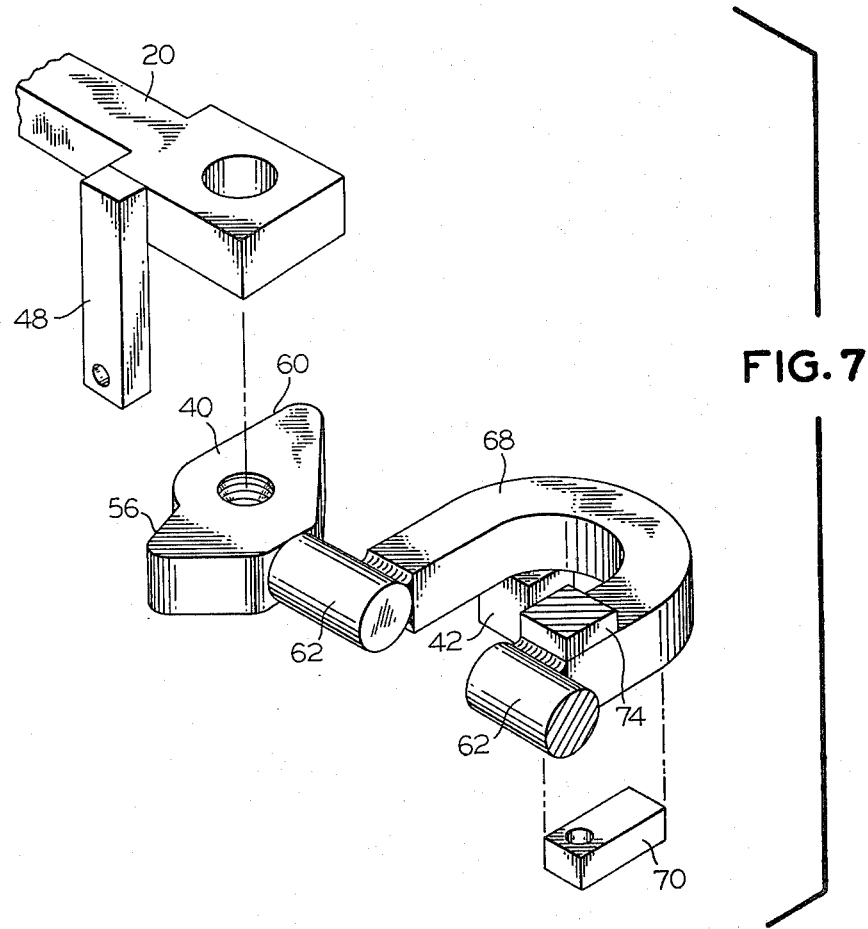
FIG. 7 is a perspective view of the mounting member of the armrest assembly with parts removed.
Figure 8:
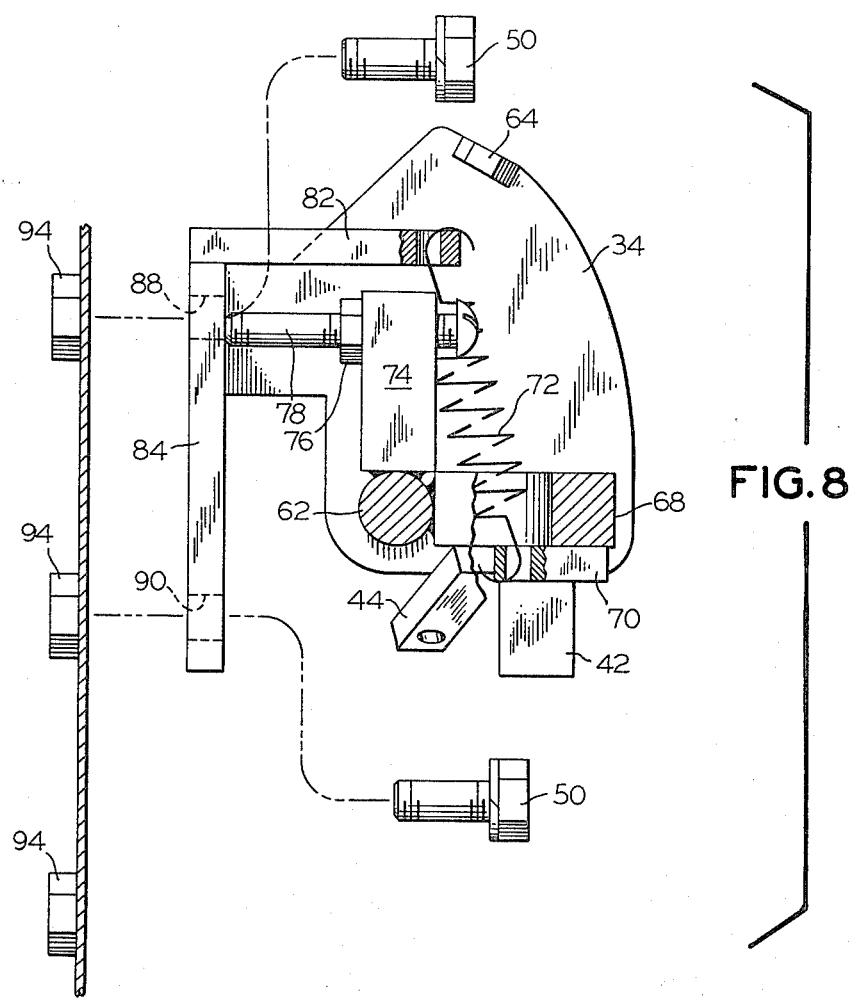
FIG. 8 is a somewhat diagrammatic side elevation of the support and mounting member in position prior to mounting on the back portion.
Figure 9:
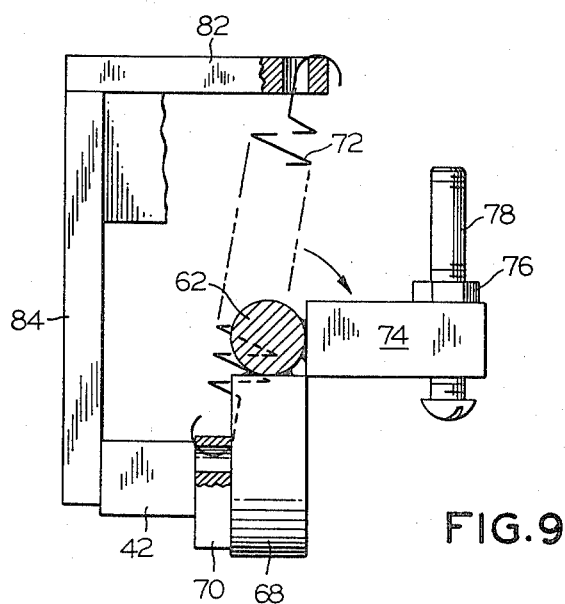
FIG. 9 shows some of the parts of FIG. 8 in an alternate orientation.

FIGS. 5 through 8 illustrate the mechanisms by which the armrests 16 are pivotably mounted and biased to stable positions. FIG. 5 is a plan view in which the cover 33 has been removed to reveal a stationary support consisting of side plates 34, forward face 84, spring mounting tab 82, and cover mounting nuts 64. The shape of the side plates 34 can best be seen in FIG. 8, while FIG. 6 provides the view from the front. Suitable holes 88 and 90 (FIG. 6) are provided as shown in FIG. 8 for mounting the support on the back portion 14 of the seat by means of mounting bolts 50 that are received in holes 88 and 90 and engage two of the internal nuts 94 in the back portion of the seat. Three nuts 94 are shown in FIG. 8 to suggest that the seat back would ordinarily include more than two nuts 94 so that the armrest assembly can be mounted at various heights. Ordinarily, around five nuts would be provided to permit a wide range of armrest-assembly heights. When the armrest assembly is mounted as suggested in FIG. 8, the support remains stationary regardless of the position of armrest 16. Nuts 64 are welded to side plates 39 of the frame so that cover 33 may be mounted on the frame by threaded engagement of nuts 64 and screws 52.

A mounting member pivotably mounted on the support for pivoting about a horizontal axis is also shown in FIGS. 5 through 8. The mounting member includes a mounting portion 40, a pivot-shaft portion 62, a horseshoe-shaped portion 68, a stop post 42, a stop-bolt mounting bar 74, a stop bolt 78, a nut 76, and spring mounting tabs 70 and 44.

The mounting member is best seen in the perspective view of FIG. 7, in which several parts are removed for clarity. The mounting member is pivotably mounted in the support by means of mounting-shaft portions 62 journaled in side plates 34 so that the mounting member can pivot about the axis of shaft 62. Horseshoe-shaped portion 68 is welded at either end to shaft portions 62 and incudes a mounting tab 70 that is welded at its rear end to the mid point of the lower surface of horseshoe-shaped portion 68. mounting tab 70 extends forward into the space below the opening of the horseshoe-shaped portion 68 for mounting of a coil spring 72 (FIG.

5) at a hole provided in mounting tab 70. The horseshoe shape of portion 68 permits coil spring 72 to extend upward from mounting tab 70 on the mounting member to mounting tab 82 on the support. Mounting tab 82 is shown in plan view in FIG. 5, and its vertical location is best seen in FIG. 6. Attention is also invited to FIG. 8, in which the extension of the coil spring 72 from mounting tab 70 to mounting tab 82 is clearly shown.

Not shown in FIG. 7 is another mounting tab 44 that is a part of the mounting member pivotably mounted in the support. Mounting tab 44 extends diagonally forward and down from the right portion of the lower surface of horseshoe-shaped portion 68, as best seen in FIGS. 5 and 8. As FIG. 6 shows, two coil springs extend from mounting tab 44 to further mounting tabs 48 that are provided on the ends of bar member 20 of armrest 16.

As FIGS. 5 and 6 illustrate, a widened end portion of bar member 20 of armrest 14 is provided with a bore that is aligned with a tapped hole in mounting portion 40 of the mounting member. A shoulder bolt 36 extends through the bore in the end of bar portion 20 to threadedly engage the tapped hole in mounting portion 40 of the mounting member. Suitable washers 58 and 86 are provided between bar portion 20 and the bolt head and between bar portion 20 and mounting portion 40.

When the armrest 16 is to be moved outward from the first position to the third position, which is shown in phantom in FIGS. 2 and 5, a moment is applied to armrest 16 about the axis of shoulder bolt 36. Initially, armrest 16 is biased to the first position by the moment applied by coil spring 46 about the axis of bolt 36. The armrest is thus biased to the first position, which is stable because coil mounting tab 48 engages a stop surface 56 on mounting portion 40. When a moment sufficient to counter the biasing moment is applied to armrest 16, it pivots about the axis of bolt 36, causing coil spring 46 also to pivot. The moment applied by spring 46 decreases as the coil spring 46 moves toward the vertical axis; although the force applied by coil spring 46 may increase somewhat, the vector product of that force and the lever arm decreases because the force and lever-arm vectors come closer to parallel. A point is eventually reached where the spring extends through the vertical axis, so the moment applied to armrest 16 about the axis is reduced to zero. As the armrest is pivoted farther, the moment begins to increase in the opposite direction, and if the armrest 16 is then released, pivoting continues until spring mounting tab 48 abuts a second stop surface 60 on mounting portion 40. If the mounting member is in the orientation shown in FIG. 8, the armrest will then be in the third, outward position, which as noted before is illustrated in FIG. 2. This third position is intended for easy dismounting of the vehicle. This is a particularly advantageous arrangement of a motorcycle armrest because the moment that must be applied by the occupant of the seat reduces as the armrest is increasingly deflected. As a result, though there is a sufficient biasing moment applied when the armrest 16 is in its first position to keep it fairly securely in the first, normal position, the moment is decreased as the occupant pivots the armrest farther in dismounting from the seat. This facilitates dismounting, and it also adds something of a safety factor in that the armrest does not whip as quickly when released to one of the stable positions as it would if there were not a lower moment in the intermediate positions of the armrest.

When it is desired to raise the armrest from the first position, shown in FIG. 4, to the second position, shown in phantom in FIG. 4, a moment need only be applied about the axis of pivot-shaft portion 62 of the mounting member. In the first position, as can be seen in FIG. 8, an adjustable stop that includes stop bolt 78 abuts forward face 84 of the support. The mounting member is biased to this position by a moment applied about the axis of shaft portion 62 by coil spring 72, which extends from mounting tab 82 to mounting tab 70. When a sufficient moment is applied to armrest 16 to counter the biasing moment applied by coil spring 72, the mounting member begins to pivot about the axis of shaft portion 62, and the coil spring 72 begins to move through an arc in a vertical plane. The moment applied by coil spring 72 reduces as coil spring 72 moves toward the axis of shaft portion 62. This reduction continues until coil spring 72 has passed the horizontal axis, at which time the moment increases in the opposite direction, thereby assisting in moving the armrest to the second position. If the armrest is released after the spring has passed the axis, pivoting of the armrest about the axis of the shaft portion 62 continues until stop post 42 on the mounting member abuts forward face 84 of the support. Armrest 16 then remains in the second stable position due to the biasing moment applied by spring 72.

It can be appreciated from the foregoing description that an armrest assembly has been provided in an arrangement particularly advantageous when used on seats, such as motorcycle seats, in which ease of mounting from the side is desirable and a hurried dismounting from the side can be expected on occasion. Pivoting in either direction is afforded without the disengagement of any locking means, and stable positions spaced about both axes from the normal position are afforded. When it is desired to mount the rear seat from the side, it only is necessary to push upward on the armrest, and it will assume the second position so that the passenger may mount and position himself without having to hold the armrest up. When the passenger is mounted and comfortable, he then needs only to pull the armrest downward and it will assume its normal position. It is noted that the mechanism provided to afford pivoting around the horizontal axis is particularly flexible because pivoting about the horizontal axis is possible even if one or the other (or both) of the armrests has been rotated backward to its third position. In other words, no particular sequence is required to pivot the armrest to the desired position.

If during the course of a ride it appears wise to hastily dismount the motorcycle, the passenger need only move sideways, and in the course of dismounting his body will push the armrest out of the way so that it will not interfere with his hurried exit. The biasing force keeping the armrest in its normal position is sufficiently high in most cases to keep the armrest in the first, normal position, but if an occasional shock momentarily deflects the armrest from its normal position, the biasing moment quickly returns it. It is therefore unnecessary to make the biasing force so high that it completely prohibits pivoting of the armrest out of its normal position in response to occasional shocks, so the biasing force can be kept low enough that hasty dismounting is not interfered with. In addition, the biasing force is greater in the normal position, where it is most needed, than in the intermediate positions. This both contributes to rapid dismounting and reduces the speed at which the armrest whips to a stable position when it is released from an intermediate position.

Having thus described the invention, we claim:

1. An armrest assembly for mounting on a seat having a seat portion and a back portion, comprising:
   a. a support adapted for mounting on the back portion of the seat with its forward face disposed thereagainst;
   b. a pair of armrests disposed on opposite sides of said support to extend along opposite sides of the associated seat, each armrest having one end pivotably supported on said support for pivoting relative to said support about a first axis, said first axis extending substantially parallel to the plane of said forward face to lie generally parallel to the planes of said seat and back portions when said support is mounted on the associated seat, by application of a moment to said armrest about said first axis from a first stable position of said armrest, in which said armrest extends substantially perpendicularly to the plane of the forward face and thereby to the associated back portion along the side of the seat when said support is mounted on the back portion, said pivoting from said first position being through an arc of at least about fifteen degrees to a second stable position thereof, each of said armrests also being pivotable relative to said support about a second axis substantially perpendicular to said first axis by application of a moment to said armrest about said second axis, said pivoting producing movement of said armrest from said first position of said armrest through an arc of at least about fifteen degrees about said second axis to a third position thereof in which ease of dismounting from the seat is permitted when said support is mounted on the back portion of the seat; and
   c. bias means associated with each armrest and applying a moment about said second axis to said armrest to bias said armrest in said first position when said armrest is in said first position and to bias said armrest in said third position when said armrest is in said third position, the moment applied by said bias means being lower when said armrest is in a range of positions intermediate between said first and third positions than when said armrest is in said first position.

2. The armrest assembly of claim 1 wherein said first axes are coaxial and further including a mounting member mounted in said support for pivoting about said coaxial first axes, each of said armrests being mounted on said mounting member for pivoting of said armrests and said mounting member with each other about said first axes so that pivoting of one armrest about said first axes causes the other armrest to pivot about said first axes, each armrest being pivotably mounted on said mounting member for independent pivoting of said armrest relative to said mounting member about its second axis.

3. The armrest assembly of claim 2 wherein said bias means associated with each of said armrests include a coil spring attached at one end to said armrest at a point thereon spaced from said second axis and attached at the other end to said mounting member, there being an intermediate position of said armrest between said first and third positions in which said spring extends through said second axis.

4. The armrest assembly of claim 1 further including second bias means applying a moment about said first axis to said armrests in said first position when said armrests are in said first position and to bias said armrests in said second position when said armrests are in said second position, said second bias means applying a moment, when said armrests are in a range of positions between said first and said second positions, that is less than the moment applied when said armrests are in said first position.

5. The armrest assembly of claim 4 further including second bias means applying a moment about said first axis to bias said armrests in said first position when said armrests are in said first position and to bias said armrests in said second position when said armrests are in said second position, said second bias means applying a moment, when said armrests are in a range of positions between said first and said second positions, that is less than the moment applied when said armrests are in said first position.

6. The armrest assembly of claim 5 wherein said second bias means include a coil spring attached at one end of said support and at the other end to a point on said mounting member spaced from said first axis, there being a position of said armrests intermediate between said first and second positions in which said spring extends through said first axis.

7. A seat assembly comprising:
   a. a seat having a seat portion and a back portion;
   b. a support mounted on said back portion with its forward face disposed thereagainst;
   c. a pair of armrests disposed on opposite sides of said support and of said seat, each armrest having one end pivotably supported on said support for pivoting relative to said support about a first axis extending substantially parallel to the planes of said forward face and said seat portion of said seat by application of a moment to said armrest about said first axis, said pivoting producing movement of said armrest between a first stable position, in which said armrest extends substantially perpendicularly to the plane of said forward face and thereby to said back portion along the side of said seat, through an arc of at least about fifteen degrees to a second stable position for ease of mounting said seat from the side thereof, each of said armrests also being pivotable relative to said support about a second axis substantially perpendicular to said first axis by application to said armrest of a moment about said second axis, said pivoting producing movement of said armrest from said first position of said armrest through an arc of at least about fifteen degrees about said second axis to a third stable position, in which said armrest is disposed relatively outwardly of said seat from said first position to permit ease of dismounting from said seat; and
   d. bias means associated with each armrest and applying a moment about said second axis to said armrest to bias said armrest in said first position when said armrest is in said first position and to bias said armrest in said third position when said armrest is in said third position, the moment applied by said bias means being lower when said armrest is in a range of positions intermediate between said first and third positions than when said armrest is in said first position.

8. The seat assembly of claim 7 wherein said first axes are coaxial and further including a mounting member mounted in said support for pivoting about said coaxial first axes, each of said armrests being mounted on said mounting member for pivoting of said armrests and said mounting member with each other about said first axes so that pivoting of one armrest about said first axes causes the other armrest to pivot about said first axes, each armrest being pivotably mounted on said mounting member for independent pivoting of said armrest relative to said mouting member about its second axis.

9. The seat assembly of claim 8 wherein said bias means associated with each of said armrests include a coil spring attached at one end to said armrest at a point thereon spaced from said second axis and attached at the other end to said mounting member, there being an intermediate position of said armrest between said first and third positions in which said spring extends through said second axis.

10. The seat assembly of claim 7 further including second bias means applying a moment about said first axis to bias said armrests in said first position when said armrests are in said first position and to bias said armrests in said second position when said armrests are in said second position, said second bias means applying a moment, when said armrests are in a range of positions between said first and said second positions, that is less than the moment applied when said armrests are in said first position.

11. The seat assembly of claim 10 wherein said first axes are coincident and further including a mounting member mounted in said support for pivoting about said coincident first axes, each of said armrests being pivotably mounted on said mounting member for pivoting of said armrest relative to said mounting member about said second axis but prevention of pivoting of said armrest about said first axis, pivoting of one of said armrests about said first axis thereby causing pivoting of the other armrest about said first axis.

12. The seat assembly of claim 11 wherein said bias means associated with each of said armrests include a coil spring attached at one end to said armrest at a point thereon spaced from said second axis and attached at the other end to said mounting member, there being an intermediate position of said armrest between said first and third positions in which said spring extends through said second axis.

13. The seat assembly of claim 12 wherein said second bias means include a coil spring attached at one end to said support and at the other end to a point on said mounting member spaced from said first axis, there being a position of said armrests intermediate between said first and second positions in which said spring extends through said first axis.

* * * * *

UNITED STATES PATENT AND TRADEMARK OFFICE
CERTIFICATE OF CORRECTION

PATENT NO. : 4,225,183
DATED : September 30, 1980
INVENTOR(S) : Michael W. Hanagan and Donald I. Schoeck It is certified that error appears in the above-identified patent and that said Letters Patent are hereby corrected as shown below:

Column 8, line 1, after "axis to" insert -- bias --

Column 9, line 8, "mouting" should be -- mounting --

Signed and Sealed this

Thirtieth Day of December 1980

[SEAL]

Attest:

SIDNEY A. DIAMOND

*Attesting Officer*     *Commissioner of Patents and Trademarks*